INVENTOR.
ARTHUR E. VOGEL
BY
Schmieding and Fultz
ATTORNEYS

INVENTOR.
ARTHUR E. VOGEL
BY
Schmieding and Fultz
ATTORNEYS

INVENTOR.
ARTHUR E. VOGEL
BY
Schmieding and Fultz
ATTORNEYS

United States Patent Office 2,992,836
Patented July 18, 1961

2,992,836
FLUID PRESSURE SPRING FOR VEHICLE SUSPENSION AND CONTROL APPARATUS THEREFOR
Arthur E. Vogel, Columbus, Ohio, assignor, by direct and mesne assignments, of one-half to Dawson-Vogel Engineering Company, Columbus, Ohio, one-fourth to Warren H. F. Schmieding, and one-fourth to Palmer Fultz, Columbus, Ohio
Filed Apr. 23, 1956, Ser. No. 579,928
19 Claims. (Cl. 280—124)

This invention relates to suspension systems for vehicles and more particularly to an apparatus for improving the cornering characteristics of a vehicle in negotiating a curve.

The conventional motor vehicle is ordinarily provided with springs between the body and the wheels of the vehicles so that such springs will absorb shocks and jars of the vehicle to provide safer and more comfortable riding for the occupants.

When the vehicle is rounding curves, however, the springs at the wheels on the side of the vehicle nearer to the center of the curve push upward on such side of the vehicle due to the fact that energy is stored in such springs by the normal weight of the vehicle. Such upward spring force helps to disturb the stability or actually upset the vehicle when rounding a curve by augmenting the centrifugal force that is concurrently exerted on the vehicle due to the fact that the vehicle is undergoing a change in direction.

The present invention constitutes an improvement in apparatus of the type disclosed in my co-pending application Serial Number 332,651, filed January 22, 1953, now Patent No. 2,960,349, dated November 15, 1960, which type of apparatus eliminates a force detrimental to the cornering characteristics of a vehicle by decreasing the effect of stored spring energy on the side of the vehicle body nearer to the center of the curve being negotiated. Other advantages of this type of apparatus are set forth in detail in the above mentioned application.

It is therefore an object of the present invention to provide an improved apparatus of the above described type that utilizes non-compressible hydraulic fluid to provide compactness of size and hence adaptability to present vehicle suspension systems, yet which is flexibly indestructible, when actuated, to provide the desired spring energy confinement, under all adverse road surface conditions encountered in rounding a curve.

It is another object of the present invention to provide a controlled suspension system for vehicles which effects confinement of energy stored in the vehicle spring and which incorporates a novel automatic control system for yieldably maintaining and automatically returning the suspension system to a predetermined confined configuration while the vehicle is negotiating a curve.

It is another object of the present invention to provide a novel controlled suspension system of the type described which may be adapted to incorporate complete independence, one from the other, of the suspension apparatus at the right side of the vehicle and the suspension apparatus at the left side of the vehicle.

It is another object of the present invention to provide a controlled suspension system of the type described which incorporates a novel automatic control system adapted to apply confining action for preventing the unloading of stored spring energy, such confining action being applied so as to permit yielding of the suspension above a predetermined confining force, and being applied against only one direction of suspension movement, whereby said suspension system can move in said one direction when road impact forces exceed said predetermined confining force, and whereby said suspension system retains its normal capacity to move in the other direction.

It is another object of the present invention to provide a controlled suspension system of the type described which incorporates a novel automatic control system adapted to apply confining action for preventing the unloading of stored spring energy, such confining action being automatically variably applied, in proportion to the confining action required, as increases and decreases in centrifugal force are encountered by the vehicle. As a result, the release of stored spring energy is prevented in all cornering conditions encountered, yet the ultimate in suspension flexibility and riding comfort is realized when rough road surface conditions are encountered for all curve radii and vehicle velocities.

It is still another object of the present invention to provide a novel controlled suspension system adapted to permit the elimination of separate shock absorber units, and which safely allows the elimination of what is commonly termed an anti-roll or transverse torsion bar, conventionally interconnected between the two sides of the front suspension system of a vehicle. By eliminating the latter, not only can complete independence of the two front wheel suspensions be safely achieved, but the adverse effect, encountered when a conventional anti-roll bar unloads stored energy in the latter half of an S-curve, is completely eliminated.

It is still another object of the present invention to provide a controlled suspension system for vehicles which incorporates a novel automatic control apparatus that yieldably automatically retains the suspension system at a predetermined normal configuration datum whereby the vehicle is automatically levelized under various magnitudes and distributions of loads applied to the vehicle.

It is still another object of the present invention to provide a novel hydraulic-pneumatic control means for a controlled suspension system that yieldaby and automatically maintains the suspension system at a predetermined normal configuration datum under various loadings of the vehicle, and which automatically varies the spring rate, or spring force per unit of deflection, in proportion to variations in loads to which the vehicle is subjected.

It is still another object of the present invention to provide a novel control means for a vehicle suspension system which means yieldably and automatically maintains the suspension system at a predetermined normal configuration datum under various loadings of the vehicle, and which means further incorporates novel variable shock absorber mechanism which automatically varies the magnitude of shock absorber resistance in proportion to variations in the loading of the vehicle.

It is still another object of the present invention to provide a novel hydraulic-pneumatic control means which incorporates, in a single unit, means for sensing variations in the distance between sprung and unsprung weights, and valve means for controlling fluid flow to retain said sprung and unsprung weights at a predetermined normal configuration.

It is still another object of the present invention to provide a novel hydraulic-pneumatic control means which incorporates, in a single unit, means for sensing variations in the distance between sprung and unsprung weights; valve means for controlling fluid flow to retain said sprung and unsprung weights at a predetermined normal configuration; and means for automatically varying shock absorber resistance in proportion to the loading of the vehicle.

It is still another object of the present invention to provide a novel hydraulic-pneumatic control means which incorporates, in a single unit, means for sensing variations in the distance between sprung and unsprung weights;

valve means for controlling fluid flow to retain said sprung and unsprung weights at a predetermined normal configuration, and integrally contained variable rate spring means that automatically varies spring rate in proportion to variations in the loading to which the vehicle is subjected.

It is still another object of the present invention to provide a novel hydraulic-pneumatic control means which incorporates, in a single unit, means for sensing variations in the distance between sprung and unsprung weights; valve means for controlling fluid flow to retain said sprung and unsprung weights at a predetermined normal configuration; means for automatically varying shock absorber resistance in proportion to the loading of the vehicle, and integrally contained variable rate spring means that automatically varies spring rate in proportion to variations in the loading to which the vehicle is subjected.

It is still another object of the present invention to provide novel controlled suspension systems which yieldably and automatically maintain a predetermined normal suspension configuration under variations in static loading, which are insensitive to road imposed impacts of short time duration, and which rapidly institute and effect corrections when inertia forces are encountered by the vehicle.

Other objects and advantages of the present invention will be apparent from the following description, reference being had to the accompanying drawings wherein a preferred form of embodiment of the invention is clearly shown.

Figure 3:
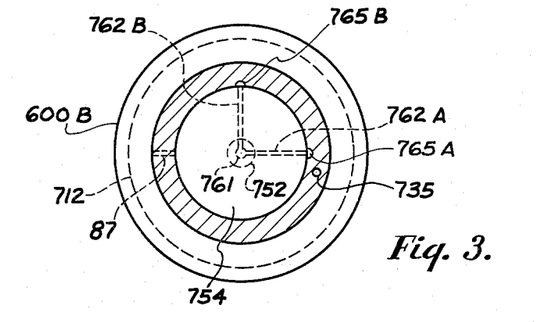
FIGURE 3 is a top sectional view of the apparatus of FIGURE 1 with the section being taken along the line 23—23 of FIGURE 1.
Figure 4:
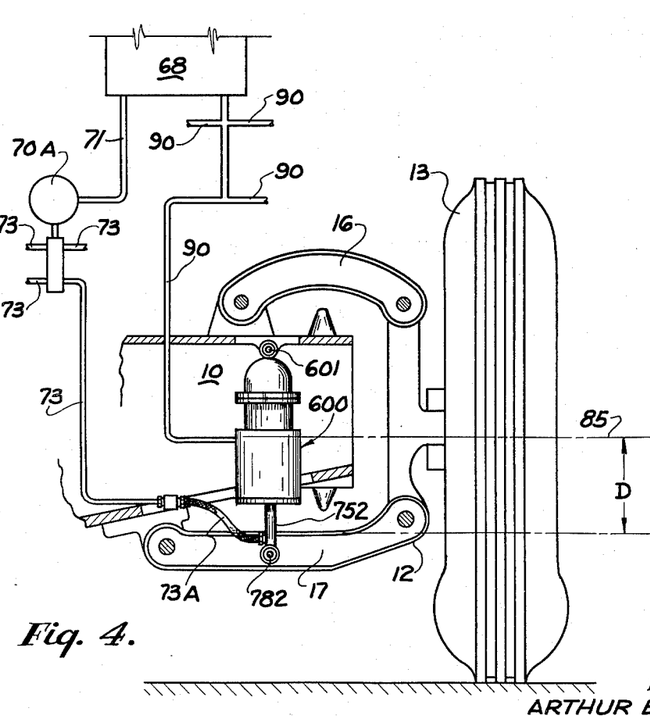
FIGURE 4 is a front diagrammatic view of a control system for a vehicle suspension which system incorporates the control apparatus of FIGURE 1.

Referring in detail to the drawings, FIGURES 1 through 4 illustrate a system comprising one aspect of the present invention. The overall system is diagrammatically illustrated in FIGURE 4 and includes four hydraulic-pneumatic means one of which is indicated generally at 600 and illustrated in detail in FIGURE 1. As seen in FIGURE 4, each of the hydraulic-pneumatic means 600 is connected between sprung portion 10 and unsprung portion 12 at pivotal connections 601 and 782 provided with resilient bushings 602. Each of the hydraulic-pneumatic means 600 receives pressurized hydraulic fluid from a controlled pump means diagrammatically illustrated and indicated generally at 70-A. A line 73 and flexible line 73-A form a high pressure conduit between controlled pump means 70-A and hydraulic-pneumatic means 600.

Controlled pump means 70-A preferably includes a pump of a variable displacement type driven by the vehicle engine, and includes a constant pressure feed-back control for the pump for maintaining constant fluid pressure at the load notwithstanding variations in flow volume demanded at the load. Such controlled pump means including constant pressure feed-back control, is designated generally at 70-A in FIGURE 4. As particular advantages of this type of controlled pump means 70-A not only is a constant hydraulic pressure head maintained available at the hydraulic-pneumatic means, but, in addition, due to the variable volume principle the volumetric delivery of the pump is independent of the revolutions per minute of the vehicle engine used to drive the pump. Hence the pump operates with maximum economy since it consumes a minimum of the power of the vehicle engine throughout the entire range of engine speeds encountered in operating the vehicle.

Each of the hydraulic-pneumatic means 600 is provided with a line 90 for the release of fluid to a reservoir means 68, and a line 71 delivers fluid from reservoir means 68 to the intake of controlled pump means 70-A. The unsprung weight 12 of FIGURE 4 includes upper control arm 16, lower control arm 17 and wheel 13. A piston rod 752 is shown extended through the bottom cover of means 600 with such rod being connected to lower control arm 17 at pivotal connection 782.

Figures 1, 2:
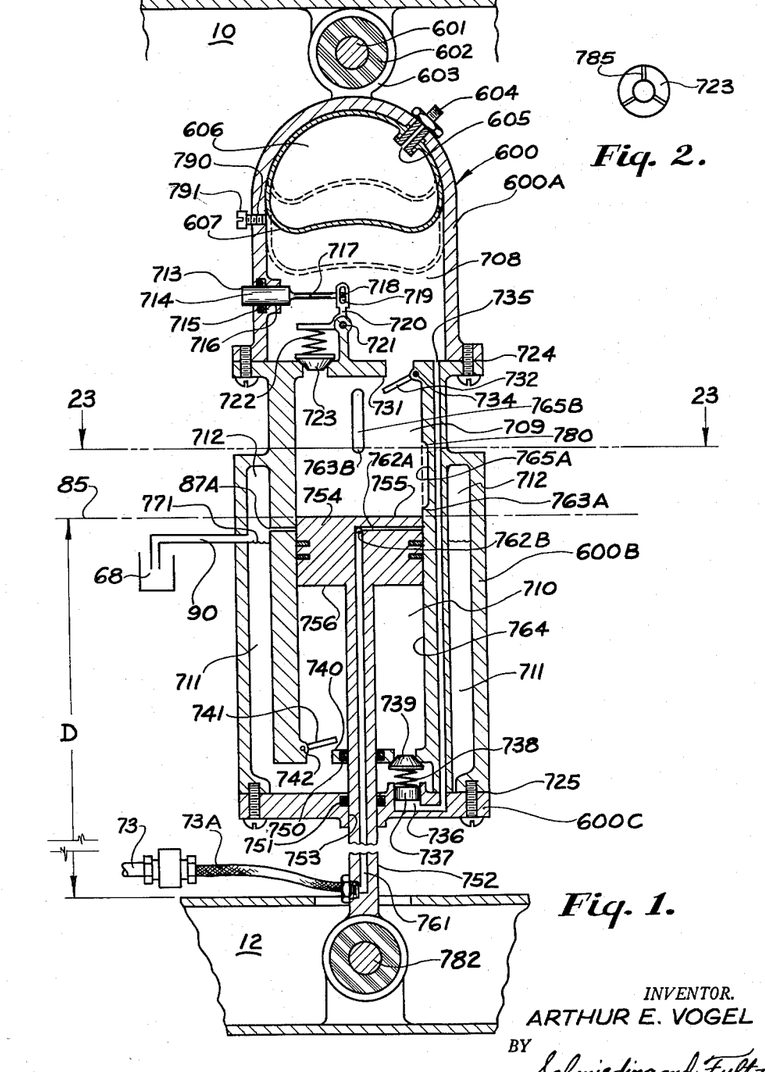
FIGURE 1 is a side sectional view of a control apparatus constructed according to the present invention. The section is taken along a vertical plane through the center of such control apparatus.
FIGURE 2 is a bottom view of a flow restrictor comprising a portion of the control apparatus of FIGURE 1.

Reference is next made to FIGURE 1 which illustrates in detail the above mentioned hydraulic-pneumatic means 600 which includes an upper casing portion 600-A, a lower casing portion 600-B and a removable cover portion 600-C. Upper casing portion 600-A forms a chamber 708 and includes a second chamber 606 separated by a moveable wall means 607. Chamber 606 contains a compressible fluid, such as air, which is introduced through a valve fitting 604 extended through the casing and the wall of a flexible bag which bag forms the confines of chamber 606. The compressible fluid in chamber 606 is expanded and compressed by oscillation of the vehicle suspension and forms the spring means at the wheel at which the unit is mounted.

As seen in FIGURE 1, a piston 754 is carried in casing portion 764 and includes a rod 752 extended through holes 753 and connected to the unsprung weight 12 at a pivotal connection 782. Since rod 752 extends through an auxiliary reservoir 711, later to be described, separate seals 750 and 751 are provided at the junction of the rod surface with the casing and cover. An upper connector 603 on upper casing portion 600-A forms a pivotal connection with the sprung weight at 601. Piston 754 separates a chamber 709 from a chamber 710. Chamber 709 communicates with chamber 708 via a first passage provided with a flow restrictor 723 and a second passage provided with a dump valve 732. Chamber 710, on the other side of piston 754, is provided with a flow restrictor 739 and dump valve 741 whereby chamber 710 communicates with an auxiliary fluid reservoir 711, the latter being in fluid communication with the main fluid reservoir of the system as is diagrammatically illustrated at 68 in FIGURE 1.

It will now be understood that when the distance between the sprung and unsprung weights increases, during operation of the vehicle, surface 756 on the piston forces fluid through flow restrictor 739 to provide shock absorber action for the down-stroke. Chamber 709 is maintained full, on such down-stroke, of fluid from chamber 708 via dump valve 732. When the distance between the sprung and unsprung weights decreases, upper surface 755 on the piston forces fluid through flow restrictor 723 to provide shock absorber action for the up-stroke.

On such up-stroke chamber 710 is maintained full of fluid from auxiliary reservoir 711 via dump valve 741.

To provide anti-cavitation means for assuring chamber 710 is maintained full of fluid, when rapid oscillations of piston 754 occur, an upper chamber portion 712 of auxiliary reservoir 711 may be maintained full of a confined compressible fluid such as air. This may be effected by locating the outlet port for line 90 below the top of the auxiliary reservoir 711 whereby the fluid level 771 is established materially below the top of the auxiliary reservoir. The chamber portion 712 will fill with air which is at atmospheric pressure when the piston 754 is at normal configuration datum line 85. Hence it will be understood that the gas in chamber portion 712 is compressed on the down-stroke of the piston and therefore has the capacity to expand on the up-stroke of the piston to drive fluid through dump valve 741 at a rapid rate. Hence chamber 710 is maintained full of fluid under all conditions.

With reference to FIGURE 2, the bottom surface of upper flow restrictor 723 is shown provided with grooves 785 that form normal flow restrictor passages past the seat when the flow restrictor is seated. Under higher fluid flow velocities the flow restrictor 723 is lifted from its seat by the flowing fluid. Lower flow restrictor 739 may be provided with similar grooves 785 to form restrictor passages for normal flow, with such restrictor 739 being lifted from its seat at higher flow rates.

The magnitude of flow restriction provided by upper flow restrictor 723 is varied in proportion to the fluid pressure in chamber 708 which in turn is varied in proportion to the load between sprung and unsprung weight portions. This is achieved by a mechanism which includes a moveable element 714 slideably extended through a hole 716 through upper casing portion 600–A. A seal 715 is provided at the confronting surfaces of element 714 and hole 716. An outer surface 713 on element 714 is exposed to atmospheric pressure whereas the inner surface of the element is exposed to the higher fluid pressure in chamber 708. Hence an outwardly directed unbalanced fluid force biases element 714 to the left, as seen in FIGURE 1, against the force exerted by a spring 722 disposed between flow restrictor 723 and a spring loader 720. The latter is pivotally mounted to the casing at a pin 721. A restricted portion 717 of element 714 is connected to an upstanding arm of spring loader 720 at a slot 719 and pin 718.

In operation, when the fluid pressure in chamber 708 increases, under increased loading of the vehicle, or when inertia forces are encountered, element 714 is moved to the left under such increased pressure whereby spring 722 is compressed to increase the magnitude of flow restriction imposed on fluid passing from chamber 709 to chamber 708 on the up-stroke of piston 754. When the pressure in chamber 708 decreases, the force in spring 722 and hence the magnitude of flow restriction is decreased in proportion to the decrease in the magnitude of the force being imposed on the vehicle.

With reference to lower flow restrictor 739, the magnitude of flow restriction imposed by such element is also varied according to the existing fluid pressure in chamber 708 but by means of a mechanism different from that of upper flow restrictor 723. A spring 738 is interposed between lower flow restrictor 739 and a spring loader 737 is slideably carried in a small cylinder 736 formed in cover portion 600–C. One side of spring loader 737 is exposed to fluid pressure of auxiliary reservoir 711, which is atmospheric or relatively low as previously described, and the other side of spring loader 737 is exposed to the fluid pressure of chamber 708 via a passage 735 and the small cylinder 736. Hence it will be understood that when the pressure in chamber 708 increases, under increased static or dynamic forces imposed on the vehicle, then spring loader 737 will move upwardly in small cylinder 736. The force in spring 738 is thereby increased whereby the magnitude of restriction imposed on fluid flow from chamber 710 to auxiliary reservoir 711 is increased in proportion to the increased load imposed on the vehicle.

When the fluid pressure in chamber 708 decreases, under decreases in static or dynamic forces being imposed on the vehicle, then the element 714 will move to the right, decreasing the force in spring 722, and spring loader 737 will move downwardly, decreasing the force in spring 738. Hence the magnitude of flow restriction imposed by flow restrictors 723 and 739 is automatically decreased in proportion to the magnitude of decrease of the static or dynamic force imposed on the vehicle.

With continued reference to FIGURE 1, the mechanism for resiliently and automatically maintaining the sprung and unsprung weights at a predetermined normal configuration will next be described. Assuming the datum 85 is fixed relative to sprung weight 10, the unsprung weight 12 is automatically maintained a predetermined distance D from the sprung weight 10, for various loadings, by novel mechanism incorporated in hydraulic-pneumatic means 600. The piston rod 752 includes axial passage 761 which communicates with radial passages 762–A and 762–B in the manner illustrated in FIGURE 3. The outer terminations of radial passages 762–A and 762–B lie in the peripheral surface of piston 754 and are normally closed by cylinder wall 764 when the sprung and unsprung weights are a normal configuration distance D apart.

At this point it should be mentioned that radial passages 762–A and 762–B form moveable position command orifices which sense departure of the sprung and unsprung weights from a predetermined relative configuration and which command such weights to return to such predetermined configuration.

With the outer terminations of the radial passages 762–A and 762–B closed, it will be understood that pressurized fluid from controlled pump means 70–A is present but restrained from flowing through the conduits 73, 73–A, 761, 762–A and 762–B to chamber 709.

When piston 754 moves upwardly relative to casing portion 600–B as occurs when the static weight of sprung weight 10 is increased, then the termination of first radial passage 762–A communicates with a lower recess 765–A in a cylinder wall 764. Such communication begins when end termination of first radial passage 762–A passes lower end 763–A of lower recess 765–A and ceases when first radial passage 762–A reaches upper end 780 of lower recess 765–A. Just prior to closure of first radial passage 762–A at upper end 780, the second radial passage 762–B is moved above lower end 763–B of an upper recess 765–B. This threshold configuration is illustrated in FIGURE 3. Upon further upward movement, beyond the threshold of connection between second radial passage 762–B and upper recess 765–B, first radial passage 762–A is closed by cylinder wall 764 to prevent pressurized fluid from being delivered from first radial passage 762–A to lower chamber 710 when the lower surface 756 of piston 754 moves above lower end 763–A of lower recess 765–A.

In view of the foregoing description it will be understood that first radial passage 762–A and lower recess 765–A interconnect to deliver pressurized fluid to chamber 709 during a portion of piston travel above normal configuration, and that second radial passage 762–B and upper recess 765–B interconnect to effect such fluid delivery during a second portion of piston travel above normal configuration.

When increased loading of short time duration occurs, and piston 754 moves upwardly to deliver pressurized fluid to chamber 709 in the manner just described, fluid will commence to flow at a relatively low flow rate due to the relatively small cross-sectional diameter of radial passage 762–A or 762–B. Hence the release of pressurized fluid to chamber 709 under normal suspension oscillations will be negligible, yet when a sustained increase in static load occurs the small radial passages 762-A and 762-B will have the time to deliver the volume of fluid required to return the suspension to normal configuration.

Fluid delivered via radial passage 762-A or 762-B to chamber 709 will pass through flow restrictor 723 and pressurize chamber 708 thereabove. As pressure increases in chambers 709 and 708 resilient means 606 is compressed, whereby the preload and spring rate thereof is increased, and, at the same time piston 754 is driven downwardly until radial passage 762-A is closed by cylinder wall 764 when piston 754 reaches normal configuration datum 85. Hence the sprung and unsprung weights are returned to the original predetermined relative configuration under the increased static weight, with the spring rate of resilient means 606 having been automatically increased to an appropriate value for the increased sprung mass of the vehicle. Hence when the suspension oscillates, the desired designed frequency of oscillation thereof will be maintained since the spring rate has been increased to an appropriate value for the increased sprung weight, of the vehicle. It will further be understood that the shock absorber resistance is automatically increased to an appropriate magnitude for the increased sprung weight in the manner previously described herein.

It should be pointed out that in FIGURE 1 normal configuration datum line 85 represents an intermediate location in a zone of short vertical extent in which piston 754 may come to rest. Such zone of normal configuration lies between the piston position at which radial passage 762-A just closes and the slightly lower piston position at which position command orifice 87-A just opens. This arrangement permits slight oscillations of the suspension without fluid being admitted or released and a savings in power is achieved.

With continued reference to FIGURE 1, when the static weight of the sprung mass of the vehicle is decreased, piston 754 will move downwardly relative to casing portion 600-B, from the normal configuration piston location shown in FIGURE 1. When the top surface 755 of piston 754 moves downwardly past a small position command orifice 87-A fluid will pass from pressurized chamber 709 through position command orifice 87-A to intermediate reservoir 711 and thence to main reservoir 68 via line 90. It will be noted that position command orifice 87-A is of relatively small cross-sectional area so that the volumetric flow rate of fluid therethrough is relatively small. Hence the release of fluid from chamber 709 will be negligible during normal oscillations of the suspension, yet under any sustained decrease in static load the small position command orifice 87-A will have the time to discharge the volume of fluid required to return the suspension to normal configuration wherein piston 754 has been returned to normal configuration datum 85. Under decreased static loadings, when fluid is released from chamber 709, through position command orifice 87-A, fluid will also pass from chamber 708 to chamber 709 via dump valve 732. With such release of fluid, the pressure in chamber 708 decreases and resilient 606 expands whereby both the preload and spring rate of resilient means 606 is automatically decreased to an appropriate value for the decreased static weight of the sprung mass. Hence the desired designed frequency of oscillation of the suspension will be automatically maintained for such decreased static weight. At the same time the spring rate is decreased the magnitude of shock absorber resistance is also automatically decreased, in the manner previously described, to an appropriate lower magnitude of resistance for such decrease in weight of the sprung mass of the vehicle.

To summarize the operation of the hydraulic-pneumatic means 600 of FIGURE 1, when the pressure in chamber 708 of the hydraulic-pneumatic means 600 is increased, to levelize the vehicle under increased loading, then the shock absorber action is increased, and, at the same time, resilient means 606 is compressed whereby the spring rate, or loading per unit of deflection, is increased. Conversely, when the pressure in chamber 708 decreases, both the shock absorber action and spring rate are decreased. Hence it will be understood that the hydraulic-pneumatic means 600 provides a novel controlled vehicle suspension which maintains the vehicle level under all variations in static loading encountered by the vehicle. Moreover, the spring rate and shock absorber action are automatically varied in proportion to such variations in loadings and forces imposed on the vehicle.

Figure 5:
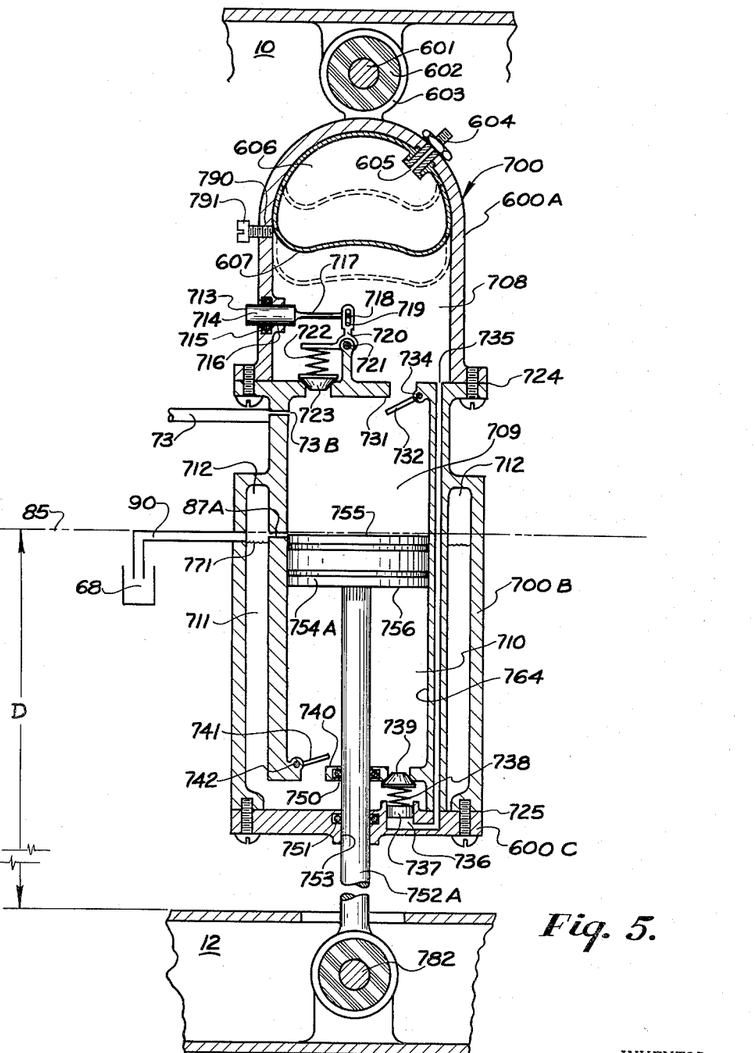
FIGURE 5 is a side sectional view of another control apparatus constructed according to the present invention and constituting another aspect thereof. The section is taken along a vertical plane through the center of such control apparatus.

Reference is next made to FIGURE 5 which illustrates another hydraulic-pneumatic means indicated generally at 700 and comprising another aspect of the present invention. The components of means 700 which are identical to components of means 600, previously described, are designated by identical numerals.

Hydraulic-pneumatic means 700 includes an upper casing portion 600-A and a lower casing portion 700-B, the lower end of the latter being closed by a removable cover 600-C. Means 700 has an upper connection 601 with sprung weight 10 and a lower connection 782 with unsprung weight 12.

As seen in FIGURE 5, a resilient means 606, and variable shock absorber mechanism comprising flow restrictors 723 and 739 are provided within the casing and such means and mechanism function in the same manner as previously described in connection with hydraulic-pneumatic means 600 of FIGURE 1.

Hydraulic-pneumatic means 700 differs from hydraulic-pneumatic means 600 in that hydraulic fluid is delivered from a controlled pump means 70-A directly into chamber 709 via line 73 and intake port 73-B. Hence the means 700 of FIGURE 5 incorporates a solid piston 754-A and solid rod 752-A.

As seen in FIGURE 5, hydraulic fluid is released from chamber 709 at a small position command orifice 87-A. Orifice 87-A delivers fluid to auxiliary reservoir 711 which in turn delivers fluid to main reservoir 68 via a line 90. Since chamber 709 is continuously pressurized by hydraulic fluid from controlled pump means 70-A, previously described, the upper surface 755 of piston 754-A is resiliently maintained at position command orifice 87-A and also at normal configuration datum 85.

The pressurized intake port 73-B and position command orifice 87-A of FIGURE 5 are both of relatively small cross-sectional area whereby the volumetric flow of fluid through such constant bleed system is relatively small. Such relatively small cross-sectional areas further serve to impose a time delay between the time the sprung and unsprung weights depart from a normal spaced distance D and the time such weights are returned to normal configuration by the action of pressurized fluid. Hence under road imposed impacts of short time duration only a relatively small quantity of hydraulic fluid will enter chamber 709 through intake port 73-B or be released from chamber 709 via position command orifice 87-A. Under changes in static load, or any change in loading of relatively long time duration, the relatively small intake port 73-B or position command orifice 87-A will have sufficient time to deliver or release enough hydraulic fluid to return the sprung and unsprung weights to normal configuration D under the new loading.

As was the case with hydraulic-pneumatic means 600, previously described, when the means 700 reestablishes the suspension at normal configuration D under a new loading, the preload and spring rate of resilient means 606, and the magnitude of shock absorber resistance imposed by flow restrictors 723 and 739 are automatically varied to new appropriate values for the new loading. Hence the desired designed frequency of oscillation of the suspension is automatically maintained under various loadings to which the vehicle is subjected.

Figure 6:
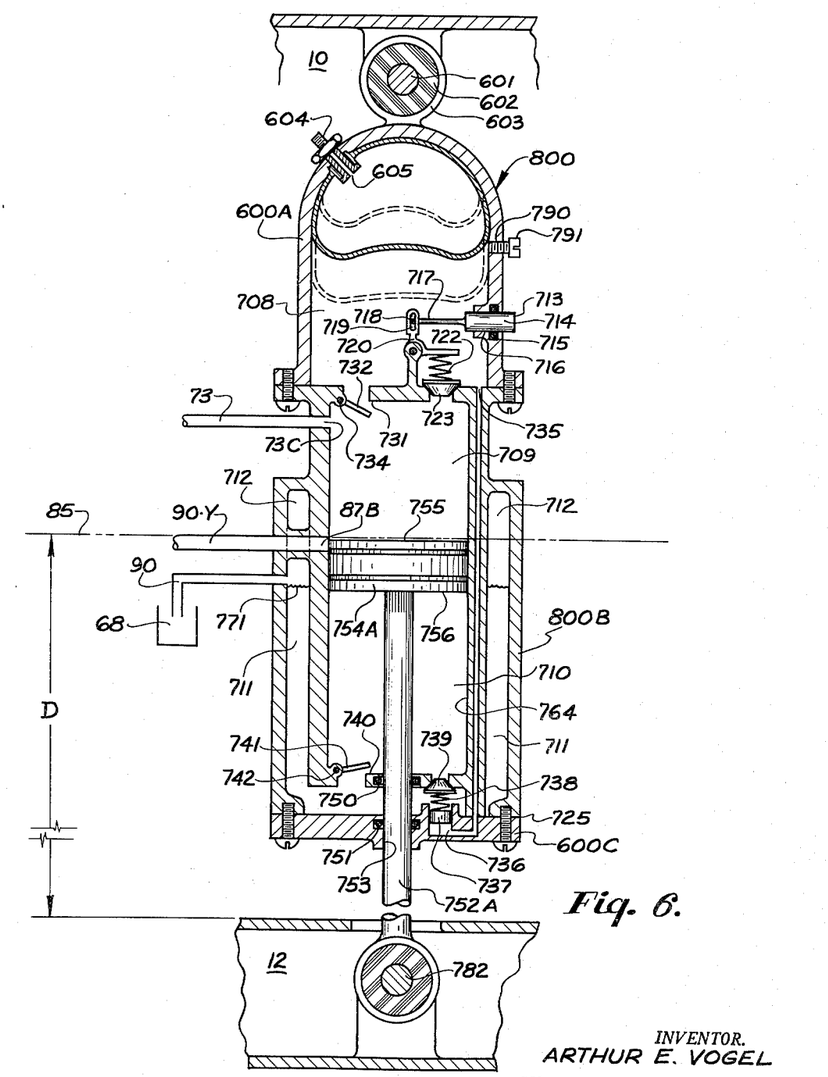
FIGURE 6 is a side sectional view of another control apparatus constructed according to the present invention and constituting another aspect thereof. The section is taken along a vertical plane through the center of such control apparatus.
Figure 8:
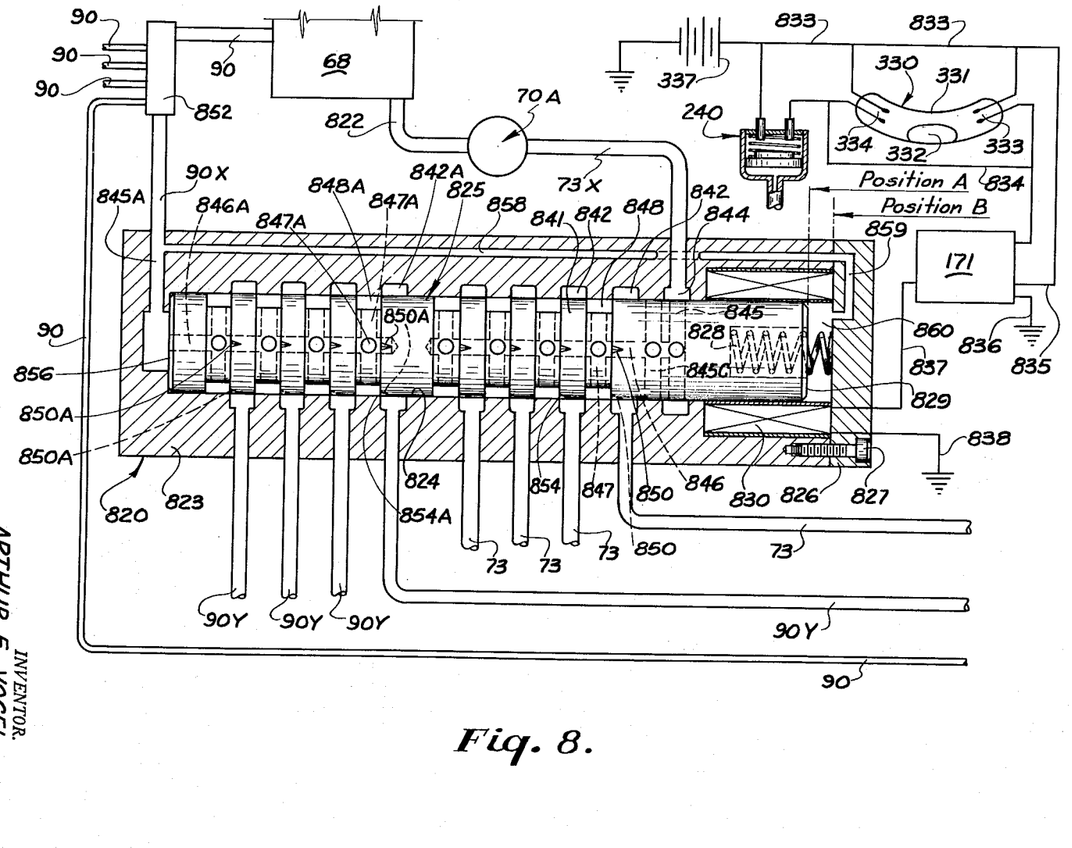
FIGURE 8 is a front diagrammatic view of a control system for a vehicle suspension which system incorporates the control apparatus of FIGURE 6 or the control apparatus of FIGURE 7.

Reference is next made to FIGURES 6 and 8 which illustrate another fluid actuated means 800 and system comprising same which constitute another aspect of the present invention. The fluid actuated means 800 is similar to fluid actuated means 700 of FIGURE 5, previously described, except that means 800 is adapted for rapid actuation to provide effective anti-roll control, or to prevent pitching of the vehicle about its longitudinal axis when changes of velocity occur such as when the brakes are applied, or to provide both anti-roll and anti-pitch control. With reference to FIGURE 6, fluid actuated means 800 includes many components identical to components of fluid actuated means 700 and such identical components are designated by identical numerals. Means 800, however, differs from means 700 in that a lower casing portion 800–B is provided with a fluid intake port 73–C and a position command orifice 87–B which are provided with relatively large cross-sectional areas as compared to the cross-sectional areas of corresponding elements 73–B and 87–A of means 700 of FIGURE 5. The purpose of such relatively large intake port 73–C and orifice 87–B is to provide large flow volume capacity for fluid actuated means 800 at times when rapid actuation thereof is required to rapidly institute an anti-roll or anti-pitch correction. When, however, the system of FIGURES 6 and 8 requires a change in fluid pressure under variations in magnitude or distribution of static load the system is adapted to restrict the volumetric flow rate of the fluid delivered to or released from chamber 709 in order that fluid actuated means 800 will not constantly make corrections in response to road imposed impacts. To automatically achieve such rapid or retarded actuation of fluid actuated means 800, a novel flow rate controller is incorporated with fluid actuated means 800. Such flow rate controller is indicated generally at 820 in FIGURE 8 and is described in detail later herein.

Figure 7:
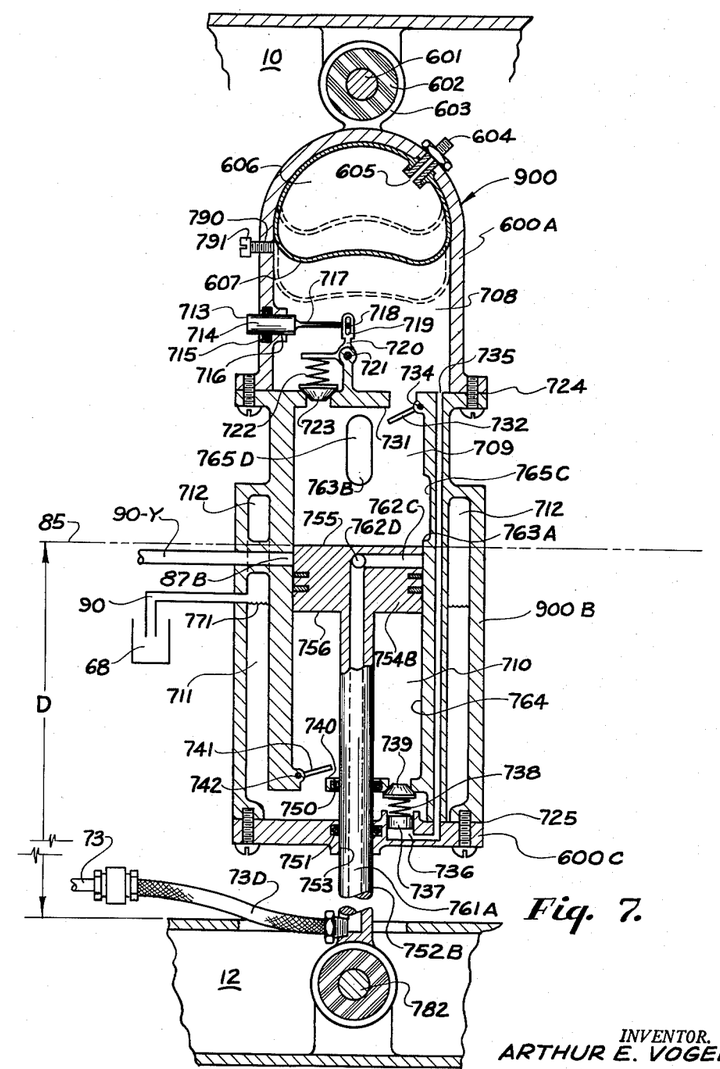
FIGURE 7 is a side sectional view of another control apparatus constructed according to the present invention and constituting another aspect thereof. The section is taken along a vertical plane through the center of such control apparatus.

Reference is next made to FIGURES 7 and 8 which illustrate another fluid actuated means 900 and system comprising same which constitute another aspect of the present invention. The fluid actuated means 900 is similar to the fluid actuated means 600 of FIGURE 1, previously described, except that means 900 is adapted for rapid actuation to provide effective anti-roll control, or to prevent pitching of the vehicle about a longitudinal axis such as when the brakes are applied, or to provide both anti-roll control and anti-pitch control. With reference to FIGURE 7, fluid actuated means 900 includes many components identical to components of fluid actuated means 600 and such identical components are designated by identical numerals. Means 900, however, differs from means 600 in that a lower casing portion 900–B is provided with a position command orifice 87–B of relatively large cross-sectional area as compared to the corresponding element 87–A of means 600 of FIGURE 1, and also in that a piston 754–B and a rod 752–B are provided with intake passages 761–A, 762–C, and 762–D which passages are of relatively large cross-sectional area as compared to the cross-sectional areas of the corresponding intake passages 761, 762–A and 762–B of means 600 of FIGURE 1. In addition, means 900 includes passages 765–C and 765–D which are of larger cross-sectional area than the corresponding passages 765–A and 765–B of means 600 of FIGURE 1. Hence it will be understood that as in the case of fluid actuated means 800 of FIGURE 6, the fluid actuated means 900 of FIGURE 7 is adapted to receive and release fluid at relatively large volumetric flow rates to effect rapid actuation of means 900 when anti-roll or anti-pitch corrections are required. When, however, the system of FIGURES 7 and 8 requires a change in fluid pressure under variations in magnitude or distribution of static load, the system is adapted to restrict the volumetric flow rate of the fluid delivered to or released from chamber 709 in order that fluid actuated means 900 will not constantly make corrections in response to road imposed impacts. To automatically achieve such rapid or retarded actuation of fluid actuated means 900, the previously mentioned flow rate controller 820 of FIGURE 8 is incorporated with fluid actuated means 900 in the manner of fluid actuated means 800 of FIGURE 6 previously described.

In view of the foregoing it will be understood that both fluid actuated means 800 and fluid actuated means 900 are adapted to effect rapid anti-roll and anti-pitch corrections, in addition to maintaining a constant distance D between sprung and unsprung weights under variations in magnitude and distribution of static weight. To effect such operational advantages either of the fluid actuated means 800 or 900 may be incorporated in the system of FIGURE 8 next to be described.

Referring next to FIGURE 8, such system should be considered in connection with FIGURES 6 or 7. When FIGURE 6 is considered the lines 73, 90–Y and 90 connect with intake port 73–C, position command orifice 87–B, and auxiliary reservoir 711, respectively. When FIGURE 7 is considered the pressurized line 73 connects with line 73–D, passage 761–A, and passages 762–C and 762–D leading to chamber 709. The other two lines 90–Y and 90 of FIGURE 8 connect with position command orifice 87–B and auxiliary reservoir 711, respectively.

The system of FIGURE 8 further includes a fluid translating means such as the previously described controlled pump means indicated generally at 70–A. Controlled pump means 70–A delivers pressurized fluid to flow rate controller 820 via a line 73–X with such fluid being delivered at substantially constant pressure but at various volumetric flow rates as required by fluid actuated means 800 or 900, or as required by flow rate controller 820. The intake of controlled pump means 70–A communicates with main reservoir 68 via a line 822.

As seen in FIGURE 8, flow rate controller 820 includes a casing 823 which forms a cylinder 824 containing a moveable spool means indicated generally at 825. Casing 823 is provided with a removable cover 826 secured in place by studs 827. A non-magnetic spring means 828, formed of brass or the like, is operatively interposed between an end 829 of spool means 825 and the inner wall of cover 826. A solenoid 830 is mounted within casing 823 so as to surround end portion 829 of spool means 825 whereby end portion 829, being of magnetic material, forms a moveable core for solenoid 830. Hence it will be understood that spring means 828 biases spool means 825 to the left to retain such spool means 825 in the normal position A illustrated in FIGURE 28. When solenoid 830 is energized, however, the magnetic force created will shift spool means 825 to the right until end portion 829 thereof engages the inner surface of cover 826.

As seen in FIGURE 8, solenoid 830 is either actuated by a mercury switch 330 or a brake actuated switch 240. Mercury switch 330 has its longitudinal axis disposed transversely to the longitudinal axis of the vehicle whereby right or left turns of the vehicle cause mercury 332 to shift in tube 331 and bridge contacts 333 or contacts 334. When contacts 333 or 334 are bridged, a holding relay 171, described in detail in my co-pending application Serial No. 541,337, is energized via battery 337, wire 833, wire 834, a solenoid, not illustrated, in holding relay 171, and wire 836 to ground. Energization of holding relay 171 connects contacts therein, not illustrated, which in turn energize solenoid 830 to shift spool means 825 as previously described. Solenoid 830 is energized via battery 337, wire 833, wire 835, holding relay 171, wire 837, solenoid 830, and wire 838 to ground.

When brake actuated switch 240, seen in FIGURE 8 and described in detail in my co-pending application Serial No. 541,337, is actuated by application of the brakes of the vehicle, then holding relay 171 is energized via battery 337, wire 833, switch 240, wire 834, the above mentioned solenoid in holding relay 171, and wire 836 to ground. When holding relay 171 is energized the above mentioned contacts in such relay are connected which in turn energize solenoid 830 via battery 337, wire 833, wire 835, holding relay 171, wire 837, solenoid 830 and wire 838 to ground.

The holding relay 171 and brake actuated switch 240 of FIGURE 8 of the present application are both illustrated in detail in FIGURE 12 of the above mentioned copending application Serial No. 541,337. Such holding relay 171 and switch 240 are designated by the same numerals 171 and 240, respectively, in FIGURE 12 of said co-pending application and are described in detail in the specification thereof.

At this point it should be mentioned that holding relay 171 serves the function of maintaining solenoid 830 energized for a short time duration after contacts 333 or 334 are disconnected, at the exit of a curve, or after the contacts of brake actuated switch 240 are disconnected. Such time delay enables the controlled suspension system to make rapid corrections when dynamic forces decrease whereby unpleasant transition sensations in riding comfort are prevented.

With continued reference to FIGURE 8, when spool means 825 is at position A, illustrated, a plurality of collars 841 are each aligned with one of a plurality of annular chambers 842. The course of fluid travel through flow controller 820 will then be via controlled pump means 70–A, line 73–X annular chamber 844, radial passages 845, axial passage 846, radial passages 847, annular chambers 848, restrictor passages 850, annular chambers 842, and lines 73 to chamber 709 of fluid actuated means 800 or 900. It should be noted that in position A, which position provides the fluid course just described, restrictor passages 850 are effective in throttling the rate of fluid flow to fluid actuated means 800 or 900 whereby said means effects corrections at a relatively slow rate for reasons previously described.

In position A, illustrated in FIGURE 8, fluid from position command orifice 87–B of fluid actuated means 800 or 900 is returned to main reservoir 68 via lines 90–Y, annular passages 842–A, restrictor passages 850–A, annular passages 848–A, radial passages 847–A, axial passage 846–A, passage 845–A, line 90–X, manifold 852, and line 90 to main reservoir 68.

As seen in FIGURES 7, 8, and 9, the auxiliary reservoirs 711 of fluid actuated means 800 and 900 are directly connected to main reservoir 68 via lines 90 without passing through flow rate controller 820.

With continued reference to FIGURE 8, spool means 825 is shifted to position B when a rapid correction and relatively great flow rate are required at fluid actuated means 800 or 900. The fluid course through flow rate controller 820 will then be via controlled pump means 70–A, line 73–X, radial passage 845–C, axial passage 846, radial passages 847, annular passages 848, annular passages 842, and lines 73 to chambers 709 of fluid actuated means 800 or 900.

In spool means position B, the fluid course in returning to reservoir is via lines 90–Y, annular passages 842–A, annular passages 848–A, radial passages 847–A, axial passage 846–A, passage 845–A, line 90–X, manifold 852, and line 90 to main reservoir 68.

It will be understood from FIGURE 8 that when spool means 825 is shifted to the right to position B, then restrictor passages 850 and 850–A are moved away from restrictor shoulders 854 and 854–A. At the same time, annular passages 848 are aligned with annular passages 842 and annular passages 848–A are aligned with annular passages 842–A. Hence all the restrictor passages 850 and 850–A are rendered inoperative by a simple solenoid actuated shifting of spool means 825.

As seen in FIGURE 8, spool means 825 is maintained in hydraulic balance by exposing both the right end 829 and the left end 856 of spool means 825 to fluid at reservoir pressure via a longitudinal passage 858 that connects passage 845–A with a passage 859, the latter being connected to chamber 860 in which the right end of spool means 825 is exposed to fluid at reservoir pressure.

In operation of the systems of FIGURES 6 and 8 or FIGURES 7 and 8, the flow rate controller 820 is normally disposed in position A whereby fluid actuated means 800 or 900 are supplied with fluid, as required, at relatively low volumetric flow rates. Hence when the previously described height control mechanism in fluid actuated means 800 or 900 dictates that a height correction be made, in a manner previously described, fluid is translated to chambers 709 at relatively low flow rates. Hence the fluid actuated means 800 or 900 will effect the height corrections required to maintain a constant normal configuration distance D between sprung and unsprung weights, yet due to the low flow rate of fluid delivery and release the fluid actuated means will be insensitive to road imposed impacts of short time duration.

When the vehicle encounters a curve, however, or when an anti-pitch correction is required, switch 330 or switch 240 will energize solenoid 830 in the manner previously described. Spool means 825 is rapidly shifted to position B whereby restrictor passages 850 and 850–A are rendered inoperative. Controlled pump means 70–A will then translate pressurized fluid at high flow rates and reservoir 68 will receive released fluid at high flow rates. Such high rates of fluid flow enable fluid actuated means 800 or 900 to rapidly institute anti-roll or anti-pitch corrections whereby the vehicle is prevented from departing from the level configuration present at the inception of the force tending to cause the vehicle to pitch or roll.

As the vehicle leaves a curve, or as the force causing a pitching moment subsides, holding relay 171 will maintain solenoid 830 energized for a time interval subsequent to breaking of electrical connection at switch 330 or 240. Hence spool means 825 will remain in position B for such time interval and high flow rates of fluid delivery to and from fluid actuated means 800 or 900 will continue for such time interval. Hence the system retains the capacity to rapidly effect the corrections necessary to return the fluid pressure values in control means 800 or 900 to the normal pressures required for equilibrium after the roll-imposing forces or pitch-imposing forces are no longer being encountered by the vehicle.

When holding relay 171 has discharged its stored charge of electrical energy, as described in said previously mentioned co-pending application Serial No. 541,337, then the vehicle will have completed the curve, or the pitching moment will have subsided, and solenoid 830 will have become deenergized whereby spool means 825 is returned to position A. This renders restrictor passages 850 and 850–A again effective whereby fluid actuated means 800 or 900 are rendered insensitive to road imposed impacts of short time duration. The system, however, will retain the capacity, with spool means 825 in position A, to effect corrections for variations in magnitude and distribution of static weight of the vehicle.

While the forms of embodiment of the present invention as herein disclosed constitute preferred forms, it is to be understood that other forms might be adopted, all coming within the scope of the claims that follow:

I claim:

1. Apparatus for controlling the suspension system of a vehicle having sprung and unsprung weights connected by resilient means, which apparatus comprises; casing means provided with a cylinder having a wall, said casing means being connected to one of said weights; piston means mounted for reciprocating motion in said cylinder, said piston means including a rod connected to the other of said weights, said piston means separating first and second chambers of said cylinder; conduit means for a flow of pressurized hydraulic fluid to certain of said chambers; valve means formed by said piston means and said wall for controlling said flow of pressurized hydraulic fluid at a certain position of said piston means in said cylinder; a first fluid actuated flow control valve means for controlling the movement of said piston means in one direction in said cylinder and a second fluid actuated flow control valve means for controlling the movement of said piston means in the other direction in said cylinder, certain of said flow control valves, means including a flow restrictor valve for restricting the flow of fluid expelled from one of said chambers by movement of said piston in one direction and an inlet valve for the free admission of fluid to said one chamber upon movement of said piston in the other direction.

2. Apparatus for controlling the suspension system of a vehicle having sprung and unsprung weights connected by resilient means, which apparatus comprises; casing means provided with a cylinder having a wall, said casing means being connected to one of said weights; piston means mounted for reciprocating motion in said cylinder, said piston means including a rod connected to the other of said weights, said piston means separating first and second chambers of said cylinder; conduit means for a flow of pressurized hydraulic fluid to said first chamber, one side of said piston being exposed to said pressurized hydraulic fluid; valve means formed by said piston means and said wall for controlling said flow of pressurized hydraulic fluid at a certain position of said piston means in said cylinder; reservoir means in fluid communication with said second chamber on the other side of said piston; and fluid actuated flow control valve means for certain of said chambers, said flow control valve means including a flow restrictor valve for restricting the flow of fluid from certain of said chambers upon movement of said piston in one direction and an inlet valve for the free admission of fluid to said certain chamber upon movement of said piston in the other direction.

3. Apparatus for controlling the suspension system of a vehicle having sprung and unsprung weights connected by resilient means, which apparatus comprises; casing means provided with a cylinder having a wall, said casing means being connected to one of said weights; piston means mounted for reciprocating motion in said cylinder, said piston means including a rod connected to the other of said weights, said piston means separating first and second chambers of said cylinder; conduit means for a flow of pressurized hydraulic fluid to certain of said chambers, one side of said piston being exposed to said pressurized hydraulic fluid; valve means formed by said piston means and said wall for controlling said flow of pressurized hydraulic fluid at a certain position of said piston means in said cylinder; reservoir means in fluid communication with said second chamber on the other side of said piston; a first fluid actuated flow control valve means between said second chamber and said reservoir means for controlling the movement of said piston means in said cylinder and a second fluid actuated flow control valve means for said first chamber, certain of said flow control valve means including a flow restrictor valve for restricting the flow of fluid expelled from one of said chambers by movement of said piston in one direction and an inlet valve for the free admission of fluid to said one chamber upon movement of said piston in the other direction.

4. Apparatus for controlling the suspension system of a vehicle having sprung and unsprung weights connected by resilient means, which apparatus comprises; casing means provided with a cylinder having a wall, said casing means being connected to one of said weights; piston means mounted for reciprocating motion in said cylinder, said piston means including a rod connected to the other of said weights, said piston means separating first and second chambers of said cylinder; conduit means for a flow of pressurized hydraulic fluid to certain of said chambers; valve means formed by said piston means and said wall for controlling said flow of pressurized hydraulic fluid at a certain position of said piston means in said cylinder; means forming a third chamber containing a hydraulic fluid; means containing a compressible fluid forming said resilient means, said compressible fluid being in compressible association with said hydraulic fluid in said third chamber; means forming a fourth chamber containing hydraulic fluid; a first flow control valve means between said first and third chambers; and a second flow control valve means between said second and fourth chambers, certain of said flow control valve means including a flow restrictor valve for restricting the flow of fluid expelled from one of said chambers by movement of said piston in one direction and an inlet valve for the free admission of fluid to said one chamber upon movement of said piston in the other direction.

5. Apparatus for controlling the suspension system of a vehicle having sprung and unsprung weights connected by resilient means, which apparatus comprises; casing means provided with a cylinder having a wall, said fluid actuated means being connected to one of said weights; piston means mounted for reciprocating motion in said cylinder, said piston means including a rod connected to the other of said weights, said piston means separating first and second chambers of said cylinder; conduit means for a flow of pressurized hydraulic fluid to certain of said chambers; valve means formed by said piston means and said wall for controlling said flow of pressurized hydraulic fluid at a certain position of said piston means in said cylinder; means forming a third chamber containing hydraulic fluid; fluid actuated flow control valve means between certain of said first and second chambers and said third chamber for controlling movement of said piston means in said cylinder, said flow control valve means including a flow restrictor valve for restricting the flow of fluid from certain of said chambers upon movement of said piston in one direction and an inlet valve for the free admission of fluid to said certain chamber upon movement of said piston in the other direction; and means for varying the effect of said fluid actuated flow control valve means on said movement responsive to variations in the pressure of said hydraulic fluid.

6. Apparatus for controlling the suspension system of a vehicle having sprung and unsprung weights connected be resilient means, which apparatus comprises; casing means provided with a cylinder having a wall, said casing means being connected to one of said weights; piston means mounted for reciprocating motion in said cylinder, said piston means including a rod connected to the other of said weights, said piston means separating first and second chambers of said cylinder; conduit means for a flow of pressurized hydraulic fluid to certain of said chambers; valve means formed by said piston means and said wall for controlling said flow of pressurized hydraulic fluid at a certain position of said piston means in said cylinder; chamber means containing a compressible fluid forming said resilient means; means for varying the pressure of said compressible fluid responsive to variations in the pressure of said hydraulic fluid; means forming a third chamber containing hydraulic fluid; fluid actuated flow control valve means between certain of said first and second chambers and said third chamber for controlling movement of said piston means in said cylinder, said flow control valve means including a flow restrictor valve for restricting the flow of fluid from certain of said chambers upon movement of said piston in one direction and an inlet valve for the free admission of fluid to said certain chamber upon movement of said piston in the other direction; and means for varying the effect of said fluid actuated flow control valve means on said movement responsive to variations in the pressure of certain of said fluids.

7. Mechanisms defined in claim 5 characterized by said flow control valve means including a moveable element exposed to the pressure of certain of said fluids.

8. Mechanisms defined in claim 6 characterized by said chamber means including a moveable wall having an outer surface exposed to said hydraulic fluid.

9. Apparatus for controlling the suspension system of a vehicle having sprung and unsprung weights connected by resilient means, which apparatus comprises; casing means provided with a cylinder having a wall, said casing means being connected to one of said weights; piston means mounted for reciprocating motion in said cylinder, said piston means including a rod connected to the other of said weights, said piston means separating first and second chambers of said cylinder; conduit means for a flow of pressurized hydraulic fluid to certain of said chambers; valve means formed by said piston means and said wall for controlling said flow of pressurized hydraulic fluid at a certain position of said piston means in said cylinder; means forming a third chamber for receiving a flow of fluid from said cylinder upon movement of said piston means; a flow restrictor for said flow of fluid from said cylinder to said third chamber said flow restrictor including a moveable element exposed to the pressure in said fluid actuated means; and a fluid inlet valve for the free admission of fluid from said third chamber to said cylinder.

10. Apparatus for controlling the suspension system of a vehicle having sprung and unsprung weights connected by resilient means, which apparatus comprises; casing means provided with a cylinder having a wall, said casing means being connected to one of said weights; piston means mounted for reciprocating motion in said cylinder, said piston means including a rod connected to the other of said weights, said piston means separating first and second chambers of said cylinder; fluid translating means for delivering a flow of pressurized fluid; reservoir means for receiving a flow of fluid from certain of said chambers; valve means for controlling certain of said flows of fluid at a certain position of said piston means in said cylinder, said valve means including a first valve portion carried by said piston means and a second valve portion carried by said casing; means forming a chamber for receiving a flow of fluid from said cylinder upon movement of said piston means; a flow restrictor for said flow of fluid from said cylinder to said chamber, said flow restrictor including a moveable element exposed to the pressure of fluid in certain of said chambers; a fluid inlet valve for the free admission of fluid from said chamber to said cylinder; and means forming a second chamber containing a compressible fluid, said second chamber including a moveable wall portion exposed to the pressure of fluid of said first chamber.

11. Apparatus for controlling the suspension system of a vehicle having sprung and unsprung weights connected by resilient means, which apparatus comprises; casing means provided with a cylinder having a wall, said casing means being connected to one of said weights; piston means mounted for reciprocating motion in said cylinder, said piston means including a rod connected to the other of said weights, said piston means separating first and second chambers of said cylinder; means forming a source of pressurized hydraulic fluid; conduit means connecting said source of pressurized hydraulic fluid with a port through a wall of said cylinder on one side of said piston; a position command orifice in said cylinder wall for releasing said pressurized hydraulic fluid from said pressurized chamber, said orifice being covered by said side of said piston means when said piston means is in a normal suspension configuration position, said orifice being uncovered by movement of said piston means away from said normal suspension configuration; reservoir means for receiving said hydraulic fluid released through said position command orifice; and fluid actuated flow control valve means for controlling the movement of said piston means in said cylinder, said flow control valve means including a flow restrictor valve for restricting the flow of fluid from certain of said chambers upon movement of said piston in one direction and an inlet valve for the free admission of fluid to said certain chamber upon movement of said piston in the other direction.

12. Apparatus for controlling the suspension system of a vehicle having sprung and unsprung weights connected by resilient means, which apparatus comprises; casing means provided with a cylinder having a wall, said casing means being connected to one of said weights; piston means mounted for reciprocating motion in said cylinder, said piston means including a rod connected to the other of said weights, said piston means separating first and second chambers of said cylinder; means forming a source of pressurized hydraulic fluid; conduit means connecting said source of pressurized hydraulic fluid with a port through a wall of said cylinder on one side of said piston; a position command orifice in said cylinder wall for releasing said pressurized hydraulic fluid from said cylinder on said one side of said piston; reservoir means for receiving said hydraulic fluid released through said position command orifice; means containing a compressible fluid, said means forming said resilient means between said sprung and unsprung weights; means forming a third chamber containing hydraulic fluid; means forming a fourth chamber containing hydraulic fluid; a first flow control valve means between said first and third chambers; and a second flow control valve means between said second and fourth chambers, certain of said flow control valve means including a flow restrictor valve for restricting the flow of fluid expelled from one of said chambers by movement of said piston in one direction and an inlet valve for the free admission of fluid to said one chamber upon movement of said piston in the other direction.

13. Apparatus for controlling the suspension system of a vehicle having sprung and unsprung weights connected by resilient means, which apparatus comprises; casing means provided with a cylinder having a wall, said casing means being connected to one of said weights; piston means mounted for reciprocating motion in said cylinder, said piston means including a rod connected to the other of said weights, said piston means separating first and second chambers of said cylinder; means forming a source of pressurized hydraulic fluid; conduit means connecting said source of pressurized hydraulic fluid with a port through a wall of said cylinder on one side of said piston; a position command orifice in said cylinder wall for releasing said pressurized hydraulic fluid from said cylinder on said one side of said piston; reservoir means for receiving said hydraulic fluid released through said position command orifice; means containing a compressible fluid, said means forming said resilient means between said sprung and unsprung weights; means forming a third chamber containing hydraulic fluid; and fluid actuated flow control valve means between certain of said first and second chambers and said third chamber for controlling the movement of said piston means in said cylinder, said flow control valve means including a flow restrictor valve for restricting the flow of fluid from certain of said chambers upon movement of said piston in one direction and an inlet valve for the free admission of fluid to said certain chamber upon movement of said piston in the other direction; and passage means connecting said third chamber with said reservoir means.

14. Apparatus for controlling the suspension system of a vehicle having sprung and unsprung weights connected by resilient means, which apparatus comprises; casing means provided with a cylinder having a wall, said casing means being connected to one of said weights; piston means mounted for reciprocating motion in said cylinder, said piston means including a rod connected to the other of said weights, said piston means separating first and second chambers of said cylinder; means forming a source of pressurized hydraulic fluid; conduit means connecting said source of pressurized hydraulic fluid with a port through a wall of said cylinder on one side of said piston; a position command orifice in said cylinder wall for releasing said pressurized hydraulic fluid from said cylinder on said one side of said piston; reservoir means for receiving said hydraulic fluid released through said position command orifice; means forming a third chamber containing hydraulic fluid; fluid actuated flow control valve means between certain of said first and second chambers and said third chamber for controlling the movement of said piston means in said cylinder, said flow control valve means including a flow restrictor valve for restricting the flow of fluid from certain of said chambers upon movement of said piston in one direction and an inlet valve for the free admission of fluid to said certain chamber upon movement of said piston in the other direction; and means for varying the effect of said fluid actuated flow control valve means responsive to variations in the pressure of said hydraulic fluid in certain of said chambers.

15. Apparatus for controlling the suspension system of a vehicle having sprung and unsprung weights connected by resilient means, which apparatus comprises; casing means provided with a cylinder having a wall, said casing means being connected to one of said weights; piston means mounted for reciprocating motion in said cylinder, said piston means including a rod connected to the other of said weights, said piston means separating first and second chambers of said cylinder; means forming a source of pressurized hydraulic fluid; conduit means connecting said source of pressurized hydraulic fluid with a port through a wall of said cylinder on one side of said piston; a position command orifice in said cylinder wall for releasing said pressurized hydraulic fluid from said cylinder on said one side of said piston; reservoir means for receiving said hydraulic fluid released through said position command orifice; means forming a third chamber containing hydraulic fluid; means containing a compressible fluid, said means forming said resilient means between said sprung and unsprung weights; a flow restrictor valve between certain of said first and second chambers and said third chamber; a fluid inlet valve for the free admission of fluid from said third chamber to said certain of said first and second chambers; and a movable element operatively associated with said flow restrictor valve, said element being exposed to the fluid pressure in certain of said chambers.

16. Mechanisms defined in claim 15 characterized by said reservoir means including a fluid connection with said third chamber.

17. Apparatus for controlling the suspension system of a vehicle having sprung and unsprung weights connected by resilient means, which apparatus comprises; casing means provided with a cylinder having a wall, said casing means being connected to one of said weights; piston means mounted for reciprocating motion in said cylinder, said piston means including a rod connected to the other of said weights, said piston means separating first and second chambers of said cylinder; conduit means for a flow of pressurized hydraulic fluid; valve means formed by said piston means and said wall for controlling said flow of pressurized hydraulic fluid at a certain position of said piston means in said cylinder means forming a third chamber for receiving fluid from said first chamber upon movement of said piston means in one direction; means forming a fourth chamber for receiving fluid from said second chamber upon movement of said piston means in the other direction; a first flow restrictor between said first and third chambers; and a second flow restrictor between said second and fourth chambers; a first fluid inlet for the free admission of fluid to said first chamber upon movement of said piston means in one direction; and a second fluid inlet for the free admission of fluid to said second chamber upon movement of said piston means in the other direction.

18. Apparatus for controlling the suspension system of a vehicle having sprung and unsprung weights connected by resilient means, which apparatus comprises; casing means provided with a cylinder having a wall, said casing means being connected to one of said weights; piston means mounted for reciprocating motion in said cylinder, said piston means including a rod connected to the other of said weights, said piston means separating first and second chambers of said cylinder; conduit means for a flow of pressurized hydraulic fluid to certain of said chambers, one side of said piston being exposed to said pressurized hydraulic fluid; valve means formed by said piston means and said wall for controlling said flow of pressurized hydraulic fluid at a certain position of said piston means in said cylinder; reservoir means for receiving said pressurized hydraulic fluid means forming a third chamber for receiving hydraulic fluid from certain of said first and second chambers upon movement of said piston means in one direction; means forming a first flow restrictor for passage of fluid to said third chamber upon movement of said piston means in said one direction; and means forming a second flow restrictor for retarding the movement of said piston in the other direction; a first fluid inlet for the free admission of fluid to said first chamber upon movement of said piston means in one direction; and a second fluid inlet for the free admission of fluid to said second chamber upon movement of said piston means in the other direction.

19. Apparatus for controlling the suspension system of a vehicle having sprung and unsprung weights connected by resilient means, which apparatus comprises; means forming a source of pressurized fluid; means forming a reservoir; casing means provided with a cylinder having a wall, said casing means being connected to one of said weights; piston means mounted for reciprocating motion in said cylinder, said piston means including a rod connected to the other of said weights, said piston means separating first and second chambers of said cylinder; first conduit means including a port in said wall and closed by said piston means when said piston means is at a certain position in said cylinder, said first conduit means being opened to said first chamber by movement of said piston; and a second conduit means communicating with said first chamber, one of said conduit means being in communication with said source and the other of said conduit means being in communication with said reservoir means forming a third chamber for receiving fluid from said first chamber upon movement of said piston means in one direction; means forming a fourth chamber for receiving fluid from said second chamber upon movement of said piston means in the other direction; a first flow restrictor between said first and third chambers; and a second flow restrictor between said second and fourth chambers; a first fluid inlet for the free admission of fluid to said first chamber upon movement of said piston means in one direction; and a second fluid inlet for the free admission of fluid to said second chamber upon movement of said piston means in the other direction.

References Cited in the file of this patent

UNITED STATES PATENTS

| | | |
|---|---|---|
| 2,115,159 | Dupuy | Apr. 26, 1938 |
| 2,363,867 | Isely | Nov. 28, 1944 |
| 2,644,699 | Weiertz | July 7, 1953 |
| 2,684,254 | Goss | July 20, 1954 |
| 2,743,941 | Walker | May 1, 1956 |
| 2,756,046 | Lucien | July 24, 1956 |

FOREIGN PATENTS

| | | |
|---|---|---|
| 341,779 | Great Britain | Mar. 21, 1930 |